(12) United States Patent
Taylor

(10) Patent No.: US 11,779,014 B2
(45) Date of Patent: Oct. 10, 2023

(54) ADJUVANTS

(71) Applicant: SYNGENTA PARTICIPATIONS AG, Basel (CH)

(72) Inventor: Philip Taylor, Bracknell (GB)

(73) Assignee: SYNGENTA PARTICIPATIONS AG, Basel (CH)

( * ) Notice: Subject to any disclaimer, the term of this patent is extended or adjusted under 35 U.S.C. 154(b) by 373 days.

(21) Appl. No.: 16/642,729

(22) PCT Filed: Aug. 3, 2018

(86) PCT No.: PCT/EP2018/071191
§ 371 (c)(1),
(2) Date: Feb. 27, 2020

(87) PCT Pub. No.: WO2019/042710
PCT Pub. Date: Mar. 7, 2019

(65) Prior Publication Data
US 2020/0404908 A1    Dec. 31, 2020

(30) Foreign Application Priority Data
Sep. 1, 2017 (GB) ..................... 1714024

(51) Int. Cl.
*A01N 31/02* (2006.01)
*A01N 25/04* (2006.01)

(52) U.S. Cl.
CPC ............. *A01N 31/02* (2013.01); *A01N 25/04* (2013.01)

(58) Field of Classification Search
None
See application file for complete search history.

(56) References Cited

U.S. PATENT DOCUMENTS

| | | | |
|---|---|---|---|
| 2004/0157745 A1* | 8/2004 | Vermeer | A01N 25/04 504/362 |
| 2005/0054538 A1 | 3/2005 | Bell et al. | |
| 2007/0281860 A1* | 12/2007 | Baur | A01N 43/38 504/223 |
| 2010/0179228 A1* | 7/2010 | Vermeer | A01N 25/04 514/783 |
| 2013/0217746 A1 | 8/2013 | Ramsay et al. | |

FOREIGN PATENT DOCUMENTS

| | | |
|---|---|---|
| WO | 03022048 A1 | 3/2003 |
| WO | 2012052544 A1 | 4/2012 |
| WO | 2012052545 A2 | 4/2012 |

OTHER PUBLICATIONS

GB Search Report for GB Application No. 1714024.5 dated Feb. 26, 2018.
International Search Report dated Oct. 10, 2018.

* cited by examiner

*Primary Examiner* — Alton N Pryor
(74) *Attorney, Agent, or Firm* — BakerHostetler; Toni-Junell Herbert

(57) ABSTRACT

This invention relates to compositions comprising water, an hydroxy-capped aliphatic alcohol ethoxylate (biological performance improving) adjuvant, a non-hydroxy-capped aliphatic alcohol ethoxylate and an agrochemical.

26 Claims, No Drawings

ADJUVANTS

CROSS-REFERENCE TO RELATED APPLICATIONS

This application is a 371 National Stage application of International Application No. PCT/EP2018/071191 filed Aug. 3, 2018 which claims priority to GB 1714024.5, filed Sep. 1, 2017, the entire contents of which applications are hereby incorporated by reference.

This invention relates to compositions comprising water, an hydroxy-capped aliphatic alcohol ethoxylate (biological performance improving) adjuvant, a non-hydroxy-capped aliphatic alcohol ethoxylate and an agrochemical.

It is known that adjuvants may improve the biological performance of an agrochemical and that certain hydroxy-capped alcohol ethoxylates may behave as such adjuvants. However, it is also known that hydroxy-capped alcohol ethoxylates may gel in certain situations. Furthermore, non-hydroxy-capped alcohol ethoxylates may have low cloud points such that solutions of them become turbid at temperatures experienced by agrochemical formulations in routine commercial storage conditions. The present invention relates to aqueous blends of hydroxy-capped alcohol ethoxylates with non-hydroxy-capped alcohol ethoxylates which may overcome both the gelling problems associated with hydroxy-capped alcohol ethoxylates and the low temperature turbidity problems associated with non-hydroxy-capped alcohol ethoxylates yet without compromising biologically adjuvancy of these ethoxylates.

Often the high loading of agrochemical active ingredients (a.i.s) in a composition means that it also becomes necessary to build in large quantities of an adjuvant such as a surfactant to give a biologically useful effect. The high a.i. loading means that the available volume of aqueous phase for solubilising an adjuvant within an aqueous-based composition or formulation is reduced and so a 25% surfactant loading in the formulation may actually be as high as 40% in the aqueous phase. The change in surfactant concentration from 25 to 30% or more is often accompanied by a significant change in the physical nature of the surfactant solution. In many systems, such as conventional aliphatic alcohol ethoxylate surfactants, this concentration range straddles the onset of liquid crystal phases (or gelation). Liquid crystals typically formed in this region are the cubic or hexagonal phases and these show high viscosity and high elasticity resulting in a highly gelled system. This means that any formulation containing surfactant in the aqueous phase in this concentration will be a stiff gel that is totally unsuitable for commercial uses since it will not pour from a bottle. This applies to all aqueous-based compositions or formulation types.

Surprisingly, it has now been found that a blend capped and uncapped surfactants may overcome not only the gelation problem experienced with the normally used uncapped surfactant but also the turbidity problems experienced with capped surfactants. Furthermore, by using the blend at a total concentration similar to that of the equivalent uncapped surfactant the present invention has established that it is possible to control the phase behaviour through blending whilst maintaining biological performance.

Thus, by using a combination of the capped and uncapped surfactant we may prevent both gelation and turbidity of an agrochemical aqueous-based composition.

Regarding capped and uncapped aliphatic alcohol ethoxylates, some definitions are useful.

An aliphatic alcohol ethoxylate is a compound of formula (I):

$$R\text{—}O\text{—}[EO]_n\text{—}X \qquad (I)$$

where R is an aliphatic group, for instance a straight or branched chain alkyl or alkenyl group; EO is ethylene oxide ($C_2H_4O$); n is the number of ethylene oxide units present (suitably a mean value); and X is a terminal moiety.

When X is H (hydrogen) the compound of formula (I) is said to be hydroxy-capped or 'uncapped'; the terminating atom is hydrogen and effectively the end-group is an hydroxy unit. In certain terminologies (for example, see US 2007/0281860, paragraphs [0118] and [0189]) the uncapped surfactants are referred to as being 'open'.

By contrast, when X is other than H (hydrogen) the compound of formula (I) is said to be non-hydroxy-capped or 'capped'; the terminating atom is generally hydrophobic (frequently an alkyl group where effectively the end-group is an alkoxy unit) and the capped surfactants are referred to as being 'closed'.

In one aspect, the present invention provides a composition comprising
(i) water
(ii) an hydroxy-capped aliphatic ethoxylate;
(iii) a non-hydroxy-capped aliphatic ethoxylate; and
(iv) an agrochemical.

The cap of component (iii) may be an aliphatic or an aromatic moiety.

The noun "agrochemical" and term "agrochemically active ingredient" are used herein interchangeably, and include herbicides, insecticides, nematicides, molluscicides, fungicides, plant growth regulators and safeners; preferably herbicides, insecticides and fungicides; more preferably fungicides and herbicides; and most preferably herbicides.

An agrochemical, or a salt of the agrochemical, selected from those given below is suitable for the present invention.

Suitable herbicides include pinoxaden, bicyclopyrone, mesotrione, fomesafen, tralkoxydim, napropamide, amitraz, propanil, pyrimethanil, dicloran, tecnazene, toclofos methyl, flamprop M, 2,4-D, MCPA, mecoprop, clodinafop-propargyl, cyhalofop-butyl, diclofop methyl, haloxyfop, quizalofop-P, indol-3-ylacetic acid, 1-naphthylacetic acid, isoxaben, tebutam, chlorthal dimethyl, benomyl, benfuresate, dicamba, dichlobenil, benazolin, triazoxide, fluazuron, teflubenzuron, phenmedipham, acetochlor, alachlor, metolachlor, pretilachlor, thenylchlor, alloxydim, butroxydim, clethodim, cyclodim, sethoxydim, tepraloxydim, pendimethalin, dinoterb, bifenox, oxyfluorfen, acifluorfen, fluoroglyco fen-ethyl, bromoxynil, ioxynil, imazamethabenz-methyl, imazapyr, imazaquin, imazethapyr, imazapic, imazamox, flumioxazin, flumiclorac-pentyl, picloram, amodosulfuron, chlorsulfuron, nicosulfuron, rimsulfuron, triasulfuron, triallate, pebulate, prosulfocarb, molinate, atrazine, simazine, cyanazine, ametryn, prometryn, terbuthylazine, terbutryn, sulcotrione, isoproturon, linuron, fenuron, chlorotoluron, metoxuron, iodosulfuron, mesosulfuron, diflufenican, flufenacet, fluroxypyr, aminopyralid, pyroxsulam, XDE-848 Rinskor and halauxifen-methyl.

Suitable fungicides include isopyrazam, mandipropamid, azoxystrobin, trifloxystrobin, kresoxim methyl, famoxadone, metominostrobin and picoxystrobin, cyprodanil, carbendazim, thiabendazole, dimethomorph, vinclozolin, iprodione, dithiocarbamate, imazalil, prochloraz, fluquinconazole, epoxiconazole, flutriafol, azaconazole, bitertanol, bromuconazole, cyproconazole, difenoconazole, hexaconazole, paclobutrazole, propiconazole, tebuconazole, triadimefon, trtiticonazole, fenpropimorph, tridemorph, fenpropidin, mancozeb, metiram, chlorothalonil, thiram, ziram, captafol, captan, folpet, fluazinam, flutolanil, carboxin, metalaxyl, bupirimate, ethirimol, dimoxystrobin, fluoxastrobin, orysastrobin, metominostrobin, prothioconazole, adepidyn, bixafen, fluxapyroxad, prothioconazole, pyraclostrobin, revysol, solatenol and xemium.

Suitable insecticides include thiamethoxam, imidacloprid, acetamiprid, clothianidin, dinotefuran, nitenpyram, fipronil, abamectin, emamectin, bendiocarb, carbaryl, fenoxycarb, isoprocarb, pirimicarb, propoxur, xylylcarb, asulam, chlorpropham, endosulfan, heptachlor, tebufenozide, bensultap, diethofencarb, pirimiphos methyl, aldicarb, methomyl, cyprmethrin, bioallethrin, deltamethrin, lambda cyhalothrin, cyhalothrin, cyfluthrin, fenvalerate, imiprothrin, permethrin, halfenprox, oxamyl, flupyradifurone, sedaxane, inscalis, rynaxypyr, cyantraniliprole, sulfoxaflor and spinetoram.

Suitable plant growth regulators include paclobutrazole and 1-methylcyclopropene.

Suitable safeners include benoxacor, cloquintocet-mexyl, cyometrinil, dichlormid, fenchlorazole-ethyl, fenclorim, flurazole, fluxofenim, mefenpyr-diethyl, MG-191, naphthalic anhydride and oxabetrinil.

Suitably, the agrochemical is selected from bicyclopyrone, mesotrione, pinoxaden, fomesafen, tralkoxydim, napropamide, amitraz, propanil, pyrimethanil, dicloran, tecnazene, toclofos methyl, flamprop M, 2,4-D, MCPA, mecoprop, clodinafop-propargyl, cyhalofop-butyl, diclofop methyl, haloxyfop, quizalofop-P, indol-3-ylacetic acid, 1-naphthylacetic acid, isoxaben, tebutam, chlorthal dimethyl, benomyl, benfuresate, dicamba, dichlobenil, benazolin, triazoxide, fluazuron, teflubenzuron, phenmedipham, acetochlor, alachlor, metolachlor, pretilachlor, thenylchlor, alloxydim, butroxydim, clethodim, cyclodim, sethoxydim, tepraloxydim, pendimethalin, dinoterb, bifenox, oxyfluorfen, acifluorfen, fluoroglyco fen-ethyl, bromoxynil, ioxynil, imazamethabenz-methyl, imazapyr, imazaquin, imazethapyr, imazapic, imazamox, flumioxazin, flumiclorac-pentyl, picloram, amodosulfuron, chlorsulfuron, nicosulfuron, rimsulfuron, triasulfuron, triallate, pebulate, prosulfocarb, molinate, atrazine, simazine, cyanazine, ametryn, prometryn, terbuthylazine, terbutryn, sulcotrione, isoproturon, linuron, fenuron, chlorotoluron, metoxuron, isopyrazam, mandipropamid, azoxystrobin, trifloxystrobin, kresoxim methyl, famoxadone, metominostrobin and picoxystrobin, cyprodanil, carbendazim, thiabendazole, dimethomorph, vinclozolin, iprodione, dithiocarbamate, imazalil, prochloraz, fluquinconazole, epoxiconazole, flutriafol, azaconazole, bitertanol, bromuconazole, cyproconazole, difenoconazole, hexaconazole, paclobutrazole, propiconazole, tebuconazole, triadimefon, trtiticonazole, fenpropimorph, tridemorph, fenpropidin, mancozeb, metiram, chlorothalonil, thiram, ziram, captafol, captan, folpet, fluazinam, flutolanil, carboxin, metalaxyl, bupirimate, ethirimol, dimoxystrobin, fluoxastrobin, orysastrobin, metominostrobin, prothioconazole, thiamethoxam, imidacloprid, acetamiprid, clothianidin, dinotefuran, nitenpyram, fipronil, abamectin, emamectin, bendiocarb, carbaryl, fenoxycarb, isoprocarb, pirimicarb, propoxur, xylylcarb, asulam, chlorpropham, endosulfan, heptachlor, tebufenozide, bensultap, diethofencarb, pirimiphos methyl, aldicarb, methomyl, cyprmethrin, bioallethrin, deltamethrin, lambda cyhalothrin, cyhalothrin, cyfluthrin, fenvalerate, imiprothrin, permethrin, halfenprox, paclobutrazole, 1-methylcyclopropene, benoxacor, cloquintocet-mexyl, cyometrinil, dichlormid, fenchlorazole-ethyl, fenclorim, flurazole, fluxofenim, mefenpyr-diethyl, MG-191, naphthalic anhydride and oxabetrinil.

Preferred agrochemical active ingredients are selected from azoxystrobin, fomesafen (suitably as the sodium salt), mesotrione, nicosulfuron, pinoxaden, isopyrazam, epoxiconazole, solatenol and cyantraniliprole.

More preferably, the agrochemical is azoxystrobin, fomesafen (suitably as the sodium salt), mesotrione, nicosulfuron or pinoxaden.

The various editions of The Pesticide Manual [especially the 14th and 15th editions] also disclose details of agrochemicals, any one of which may suitably be used in the present invention.

Suitably, compositions of the invention may comprise one or more of the agrochemicals described above.

Generally any agrochemically active ingredient will be present at a concentration of from about 0.000001% to about 90% w/w; preferably from about 0.001% to about 90% w/w. Agrochemical compositions of the invention may be in the form of a ready-to-use formulation or in concentrate form suitable for further dilution by the end user, and the concentration of agrochemical and the blend of (i) plus (ii) will be adjusted accordingly. In concentrated form, compositions of the invention typically contain an agrochemical at from 5 to 90% w/w, more preferably from 5 to 75% w/w, even more preferably from 10 to 50% w/w, most preferably from 20 to 40% w/w, of the total composition.

Typically the blend of (ii) plus (iii) will be at a total concentration of from about 0.0005% to about 90% w/w of the total composition; preferably from about 0.01% to about 90% w/w. When in concentrated form, compositions of the invention typically contain the blend at from 1% to 80% w/w, preferably from 5% to 60% w/w, more preferably from 20% w/w to 60% w/w and even more preferably from 20% w/w to 40% w/w of the total composition.

The compositions of the present invention may relate to concentrates designed to be added to a farmer's spray tank of water or they may be applied directly without further dilution. The present invention also relates to compositions produced in a farmer's spray tank of water when a concentrate is mixed with water in the spray tank.

Preferably compositions are selected from an SC (suspension concentrate); an SL (soluble liquid); EW (emulsion in water); a SE (suspension-emulsion); and a CS (capsule suspension); more preferably from an SC (suspension concentrate) and an SL (soluble liquid).

Furthermore, an adjuvant blend as herein described may be designed to be added to a formulation of an agrochemical (for example by mixing with water in a farmer's spray tank). The compositions of the present invention may include other ingredients such as an anti-foam agent, an anti-bacterial agent, colourant, perfume etc.

Throughout this description, terminology such as $C_{8-20}$ alkyl or $C_{8-20}$ alkenyl means that the alkyl (or alkenyl) moiety has from 8 to 20 carbon atoms (rather than meaning it is a mixture of alkyl chain lengths from $C_8$ to $C_{20}$).

Suitably the hydroxy-capped aliphatic ethoxylate (ii) is a compound of formula (Ia):

$$R_a\text{—}O\text{—}[EO]_{na}\text{—}H \quad \quad \text{(Ia)}$$

where $R_a$ is linear or branched (singly or multiply branched) $C_{8-20}$ alkyl, or $C_{8-20}$ alkenyl; and $n_a$ is from 5 to 25.

Preferably $R_a$ is $C_{12-18}$alkyl or $C_{12-18}$alkenyl. When $R_a$ is alkenyl, most preferably it is oleyl.

Preferably $n_a$ is from 10 to 20; more preferably it is 20.

Suitably, $n_a$ is a mean value.

Suitably the non-hydroxy-capped aliphatic ethoxylate (iii) is a compound of formula (Ib):

$$R_b\text{—}O\text{-}[EO]_{nb}\text{—}(C\text{=}O)_y\text{—}X_b \quad \quad \text{(Ib)}$$

where $R_b$ is linear or branched (singly or multiply branched) $C_{8-20}$ alkyl, or $C_{8-20}$ alkenyl; $n_b$ is from 5 to 25; y is 0 or 1; and $X_b$ comprises from 4 to 10 carbon atoms and is an aliphatic or an aromatic group.

Preferably $R_b$ is $C_{12-18}$alkyl or $C_{12-18}$alkenyl. When $R_b$ is alkenyl, most preferably it is oleyl.

Preferably $n_b$ is from 10 to 20; more preferably it is 20.

Suitably, $n_b$ is a mean value.

The moiety $(C=O)_y$—$X_b$ means that the compound of formula (Ib) is capped either by an ether (y=0) or an ester (y=1) linkage. In one aspect, y=0; in another aspect, y=1.

Preferably $X_b$ comprises from 5 to 8 (more preferably from 6 to 8) carbon atoms.

When $X_b$ is aliphatic is may be alkenyl or linear or branched (singly or multiply branched) alkyl.

Suitably the cap is selected from n-hexyl, benzoyl, n-hexanoyl, n-octanoyl and 2-ethylhexanoyl.

In one aspect of the present invention, the compounds of formula (Ia) and (Ib) differ only in the nature of the cap; i.e. $R_a=R_b$ and $n_a=n_b$.

The following examples demonstrate the effect on gelling plus the biological performance of blends according to the present invention. Unless otherwise stated, all concentrations and ratios are by weight. In an embodiment wherein the ratio of (ii) to (iii) is from 9:1 to 1:9

EXAMPLE 1

This example provides de-gelling temperatures and cloud points of blends of oleyl 20 ethoxylate (uncapped) with an n-hexyl ether end capped derivative (i.e. compounds of formula (I) where R=oleyl; n=20; and n=either H or n-hexyl).

The temperatures at which blends of capped and uncapped surfactants de-gel were determined by standard low shear rheology with a Bohlin™ Gemini rheometer. The storage modulus (G') at 1 Hz was determined at a strain of 0.001-0.002 in a standard C14 cup and bob geometry over a temperature range of 5-70° C., the exact range depending on the de-gelling point of the sample. Plots of storage modulus versus temperature were constructed and the de-gelling temperature was taken to be the point at which the modulus begins to fall rapidly from its high value in the gelled state (typically ca. $10^5$ Pa) down to the final value in the de-gelled state (less than 10 Pa). Blends of surfactants were prepared at from 25 to 40% w/w total surfactant concentration in water. Samples were left in an oven at 55° C. for several days to ensure that the mixtures were homogeneous. Samples were placed in the C14 cup and the samples were de-gelled by raising the temperature in the rheometer, the bob was then inserted and the sample was then cooled at 1° C./min, whilst the storage modulus was regularly recorded during the cooling. Once the final temperature had been reached (i.e. when the sample had gelled), the temperature was then increased again and the modulus again recorded. The de-gelling temperature was determined from the increasing temperature cycle.

TABLE 1

De-gelling temperatures for blends of Oleyl 20EO and Oleyl 20EO n-hexyl ether.

| Ratio of uncapped: capped (mass) | | Total surfactant concentration/% w/w | | | |
|---|---|---|---|---|---|
| Oleyl 20 EO | Oleyl 20EO hexyl ether | 25 | 30 | 35 | 40 |
| | | De-gelling temperature/° C. | | | |
| 1 | 0 | 26.9 | 45.2 | 51.3 | 70.6 |
| 0.75 | 0.25 | 5.0 | 35.6 | 50.0 | 53.2 |
| 0.5 | 0.5 | 7.3 | 30.0 | 35.7 | 38.5 |
| 0.25 | 0.75 | 5.0 | 28.0 | 29.1 | 27.6 |
| 0 | 1 | 5.0 | 5.0 | 5.0 | 16.7 |

Cloud Point Measurement

Consistent with the standard method for measuring the cloud point of surfactants, the cloud point of each of the above blends was measured at a total concentration of 1% w/w in water using a Perkin Elmer spectrophotometer fitted with a PTP6 temperature controller. The absorbance of the solution at 500 nm wavelength was determined as a function of temperature. The cloud point was recorded as the onset of a rapid increase in absorbance as the solution began to cloud.

TABLE 2

Cloud points for blends of Oleyl 20EO and Oleyl 20EO n-hexyl ether.

| [Oleyl 20 EO]/% | [Oleyl 20EO n-hexyl ether]/% | Cloud point/° C. |
|---|---|---|
| 1 | 0 | >90 |
| 0.5 | 0.5 | 84.6 |
| 0.25 | 0.75 | 70.0 |
| 0 | 1 | 52.0 |

These data show that by blending capped and uncapped surfactants the de-gelling temperature can be reduced compared to that of the uncapped surfactant alone. This is most efficacious in the total surfactant concentration range of 25-30% w/w where the de-gelling temperature is below room temperature and thus a formulation containing this level of surfactant in its aqueous phase is not gelled at ambient. In all cases, the cloud point is acceptable for these blends but in some cases the cloud point of the capped is low but shows better biological activity (see below) than the uncapped version. In this case, blending in some uncapped with a capped surfactant increases the cloud point without significantly gelling the system.

EXAMPLE 2

The biological efficacies of blends of an oleyl 20 ethoxylate uncapped surfactant with an oleyl 20 ethoxylate surfactant with an n-hexyl ether cap as adjuvants for the herbicide nicosulfuron were tested in a glasshouse against three weed species sown into standard soil in pots and cultivated under controlled conditions in a glasshouse (24/18° C. day/night; 16 hours light; 65% humidity). Nicosulfuron was added to the spray tank as a standard WG (water dispersible granule) formulation. The plants were sprayed with nicosulfuron at rates of 15 or 60 grams of pesticide per hectare using a laboratory track sprayer which delivered the aqueous spray composition at a rate of 200 litres per hectare, using a flat fan nozzle (Teejet 11002VS) at 2 bar. The adjuvants were added to the spray solution at a total rate of 0.1 or 0.2% w/v in all cases and at extra lower rates for the oleyl 20EO alone and its 1:1 blend with the oleyl 20EO n-hexyl ether to show the dose response to these adjuvants. All spray solutions also contained 10% w/w of iso-propanol. The weed species and their BBCH growth stage at spraying were *Chenopodium album* (CHEAL; growth stage 15), *Digitaria sanguinalis* (DIGSA; growth stage 14), and *Commelina benghalensis* (COMBE; growth stage 14). Each spray test was replicated three times. The test plants were then grown in a glasshouse under controlled conditions (24/18° C. day/night; 16 hours light; 65% humidity) and watered twice a day. The efficacy of the herbicide was assessed visually and expressed as a percentage of the leaf area killed. Samples were assessed at a time period of 21 days following application. The following tables (3-8) show the effect of blends of the two surfactants at a total concentration of 0.2 and 0.1%. In each case the blends were 1:0, 3:1, 1:1, 1:3 and 0:1 w/w of oleyl 20EO:oleyl 20 EO n-hexyl ether.

TABLE 3

Mean control results for nicosulfuron with different blends of oleyl 20EO and oleyl 20EO n-hexyl ether on COMBE (21 DAA assessment) at 0.2% surfactant total concentration.

| [Oleyl 20EO]/% | [Oleyl 20EO n-hexyl ether]/% | Mean control/% 15 g ai/ha | Mean control/% 60 g ai/ha |
|---|---|---|---|
| 0.2 | 0 | 80 | 72.5 |
| 0.15 | 0.05 | 66.7 | 80 |
| 0.1 | 0.1 | 76.7 | 88.3 |
| 0.05 | 0.15 | 75 | 60 |
| 0 | 0.2 | 80 | 72.5 |

TABLE 4

Mean control results for nicosulfuron with different blends of oleyl 20EO and oleyl 20EO n-hexyl ether on COMBE (21 DAA assessment) at 0.1% surfactant total concentration.

| [Oleyl 20EO]/% | [Oleyl 20EO n-hexyl ether]/% | Mean control/% 15 g ai/ha | Mean control/% 60 g ai/ha |
|---|---|---|---|
| 0.1 | 0 | 63.3 | 63.3 |
| 0.075 | 0.025 | 68.3 | 65 |
| 0.05 | 0.05 | 58.3 | 68.3 |
| 0.025 | 0.075 | 53.3 | 45 |
| 0 | 0.1 | 70 | 73.3 |

TABLE 5

Mean control results for nicosulfuron with different blends of oleyl 20EO and oleyl 20EO n-hexyl ether on *chenopodium album* at 0.2% total surfactant concentration.

| [Oleyl 20EO]/% | [Oleyl 20EO n-hexyl ether]/% | Mean control/% 15 g ai/ha | Mean control/% 60 g ai/ha |
|---|---|---|---|
| 0.2 | 0 | 83.3 | 80 |
| 0.15 | 0.05 | 81.7 | 81.7 |
| 0.1 | 0.1 | 85 | 83.3 |
| 0.05 | 0.15 | 85 | 85 |
| 0 | 0.2 | 81.7 | 88.3 |

TABLE 6

Mean control results for nicosulfuron with different blends of oleyl 20EO and oleyl 20EO n-hexyl ether on *chenopodium album* at 0.1% total surfactant concentration.

| [Oleyl 20EO]/% | [Oleyl 20EO n-hexyl ether]/% | Mean control/% 15 g ai/ha | Mean control/% 60 g ai/ha |
|---|---|---|---|
| 0.1 | 0 | 86.7 | 80 |
| 0.075 | 0.025 | 85 | 85 |
| 0.05 | 0.05 | 85 | 85 |
| 0.025 | 0.075 | 86.7 | 86.7 |
| 0 | 0.1 | 85 | 85 |

TABLE 7

Mean control results for nicosulfuron with different blends of oleyl 20EO and oleyl 20EO n-hexyl ether on *digitaria sanguinalis* at 0.2% total surfactant concentration.

| [Oleyl 20EO]/% | [Oleyl 20EO n-hexyl ether]/% | Mean control/% 15 g ai/ha | Mean control/% 60 g ai/ha |
|---|---|---|---|
| 0.2 | 0 | 83.3 | 80 |
| 0.15 | 0.05 | 80 | 75 |
| 0.1 | 0.1 | 83.3 | 76.7 |
| 0.05 | 0.15 | 80 | 76.7 |
| 0 | 0.2 | 73.3 | 81.7 |

TABLE 8

Mean control results for nicosulfuron with different blends of oleyl 20EO and oleyl 20EO n-hexyl ether on *digitaria sanguinalis* at 0.1% total surfactant concentration.

| [Oleyl 20EO]/% | [Oleyl 20EO n-hexyl ether]/% | Mean control/% 15 g ai/ha | Mean control/% 60 g ai/ha |
|---|---|---|---|
| 0.1 | 0 | 76.7 | 60 |
| 0.075 | 0.025 | 76.7 | 75 |
| 0.05 | 0.05 | 65 | 82.7 |
| 0.025 | 0.075 | 81.7 | 76.7 |
| 0 | 0.1 | 81.7 | 75 |

The data in Tables 3-8 show that blending the capped and uncapped surfactants generally had no significant detrimental effect on the biological activity of the nicosulfuron. In some cases, the capped surfactant showed greater activity than the uncapped surfactant; and in some cases the blends were marginally more active than the non-blended surfactants.

The following tables show the activity of nicosulfuron in the presence of either oleyl 20EO alone or a 1:1 blend of oleyl 20EO:Oleyl 20EO n-hexyl ether over a range of adjuvant concentrations

TABLE 9

Mean control results for nicosulfuron showing dose response against oleyl 20EO concentration on CHEAL.

| [Oleyl 20EO]/% | Mean control/% 15 g ai/ha | Mean control/% 60 g ai/ha |
|---|---|---|
| 0 | 4.0 | 8.3 |
| 0.05 | 81.7 | 83.3 |
| 0.1 | 86.7 | 80.0 |
| 0.2 | 83.3 | 80.0 |

TABLE 10

Mean control results for nicosulfuron showing dose response against 1:1 blend of oleyl 20EO:oleyl 20EO n-hexyl ether concentration on CHEAL.

| [1:1 Oleyl 20EO n-hexyl ether:Oleyl 20EO]/% | Mean control/% | |
|---|---|---|
| | 15 g ai/ha | 60 g ai/ha |
| 0 | 4.0 | 8.3 |
| 0.025 | 75.0 | 76.7 |
| 0.05 | 80.0 | 80.0 |
| 0.1 | 85.0 | 85.0 |
| 0.2 | 85.0 | 83.3 |

TABLE 11

Mean control results for nicosulfuron showing dose response against oleyl 20EO concentration on DIGSA.

| [Oleyl 20EO]/% | Mean control/% | |
|---|---|---|
| | 15 g ai/ha | 60 g ai/ha |
| 0 | 4.0 | 33.3 |
| 0.05 | 60.0 | 53.3 |
| 0.1 | 76.7 | 60.0 |
| 0.2 | 83.3 | 80.0 |

TABLE 12

Mean control results for nicosulfuron showing dose response against 1:1 blend of oleyl 20EO:oleyl 20EO n-hexyl ether concentration on *digitaria*.

| [1:1 Oleyl 20EO n-hexyl ether:Oleyl 20EO]/% | Mean control/% | |
|---|---|---|
| | 15 g ai/ha | 60 g ai/ha |
| 0 | 4.0 | 33.3 |
| 0.025 | 53.3 | 70.0 |
| 0.05 | 76.7 | 70.0 |
| 0.1 | 65.0 | 82.7 |
| 0.2 | 83.3 | 76.7 |

The differential response is here used to further illustrate the effect of blending. The data are expressed below as the difference in activity between the activity of the uncapped oleyl 20EO and the uncapped blended at 1:1 with capped surfactant (activity of the 1:1 blend of uncapped:capped-activity of uncapped).

TABLE 13

Differential dose response on CHEAL.

| [Surfactant]/% | Mean control/% | |
|---|---|---|
| | 15 g ai/ha | 60 g ai/ha |
| 0.050 | −1.7 | −3.3 |
| 0.1 | −1.7 | 5.0 |
| 0.2 | 1.7 | 3.3 |

TABLE 14

Differential dose response on DIGSA.

| [Surfactant]/% | Mean control | |
|---|---|---|
| | 15 g ai/ha | 60 g ai/ha |
| 0.050 | 16.7 | 16.7 |
| 0.1 | −11.7 | 22.7 |
| 0.2 | 0.0 | −3.3 |

The differential dose responses show that the response was very similar on CHEAL at both ai rates and all three surfactant rates. The response was very similar in DIGSA at both ai rates at 0.2% surfactant, whilst at the two lower adjuvant rates, the responses showed greater differences, but in 3 out of 4 cases the greater activity was seen with the 1:1 blend of oleyl 20EO:Oleyl 20EO n-hexyl ether.

Overall, the results show that blending the uncapped and the capped versions of the surfactants generally does not lead to any significant reduction in biological activity compared to the uncapped surfactant alone. In some cases, incorporation of the capped surfactant improved the biological activity.

EXAMPLE 3

This example provides de-gelling, cloud point and adjuvancy data for oleyl 20 ethoxylate blended with oleyl 20 ethoxylate benzoate end capped.

Degelling temperatures—the measurements relied on the same method as for 'Example 1' but just at 30% w/w total surfactant concentration.

Cloud point—the measurements relied on the same method as for 'Example 1'

TABLE 15

| [Surfactant]/% | | De-gelling temperature/° C. 30% w/w | Cloud point/° C. 1% |
|---|---|---|---|
| Oleyl 20 EO | Oleyl 20EO benzoate | | |
| 1 | 0 | 42.4 | >95.0 |
| 0.75 | 0.25 | 26.9 | >95.0 |
| 0.5 | 0.5 | 19.9 | 75.3 |
| 0.25 | 0.75 | 3.8 | 49.9 |
| 0 | 1 | <3.8° C. | 27.3 |

These data show that by blending the capped and the uncapped surfactants the de-gelling temperature can be reduced compared to that of the uncapped alone at 30% total surfactant concentration such that the de-gelling temperature is below room temperature and thus a formulation containing this level of surfactant in its aqueous phase will not be gelled. In all cases, the cloud point is acceptable for these blends but in some cases the cloud point of the capped is low but shows better biological activity (see below) than the uncapped version. In this, blending in some uncapped with a capped increases the cloud point without significantly gelling the system.

Adjuvancy for Nicosulfuron.

The biological efficacies of blends of oleyl 20 ethoxylate and oleyl 20EO ethoxylate with a benzoate cap as adjuvants for the herbicide nicosulfuron were tested in a glasshouse using the same method as for 'Example 1' but against just two weed species and with just 0.2% w/v total adjuvant concentration. The weed species and their BBCH growth stage at spraying HI were *Chenopodium album* (CHEAL; growth stage 13-15) and *Digitaria sanguinalis* (DIGSA; growth stage 14-22).

TABLE 16

Mean control results for nicosulfuron with different blends on *digitaria sanguinalis*.

| [Oleyl 20EO]/% | [oleyl 20EO benzoate]/% | Mean control/% 15 g ai/ha | 60 g ai/ha |
|---|---|---|---|
| 0.2 | 0 | 91.3 | 85.0 |
| 0.15 | 0.05 | 97.0 | 97.7 |
| 0.1 | 0.1 | 92.7 | 99.7 |
| 0.05 | 0.15 | 93.0 | 99.0 |
| 0 | 0.2 | 96.7 | 99.3 |

TABLE 17

Mean control results for nicosulfuron with different blends on *chenopodium album*.

| [Oleyl 20EO]/% | [oleyl 20EO benzoate]/% | Mean control/% 15 g ai/ha | 60 g ai/ha |
|---|---|---|---|
| 0.2 | 0 | 66.7 | 68.3 |
| 0.15 | 0.05 | 76.7 | 76.7 |
| 0.1 | 0.1 | 70.0 | 76.7 |
| 0.05 | 0.15 | 75.0 | 78.3 |
| 0 | 0.2 | 75.0 | 81.7 |

The results show that blending the uncapped and the capped versions of the surfactants does not lead to any significant reduction in biological activity compared to the uncapped surfactant alone. In some cases, incorporation of the capped surfactant improved the biological activity; and in some cases the blends were marginally more active than the non-blended surfactants.

EXAMPLE 4

This example provides de-gelling, cloud point and adjuvancy data for oleyl 20 ethoxylate with n-hexanoyl, n-octanoyl or 2-ethyl hexanoyl ester caps end capped oleyl 20 ethoxylate.

De-gelling temperatures were measured using the same method as in Example 1.

TABLE 18

De-gelling temperatures for blends of oleyl 20EO and oleyl 20EO n-hexanoyl ester.

| Ratio of uncapped: capped | | Total surfactant concentration/% w/w | | | |
|---|---|---|---|---|---|
| Oleyl 20 EO | Oleyl 20EO n-hexanoyl ester | 25 | 30 | 35 | 40 |
| | | Degelling temperature/° C. | | | |
| 1 | 0 | 26.9 | 45.2 | 51.3 | 70.6 |
| 0.75 | 0.25 | 13.3 | 32.4 | 44.9 | 48.5 |
| 0.5 | 0.5 | — | 9.2 | 22.5 | 31.9 |
| 0.25 | 0.75 | — | — | — | 15.0 |
| 0 | 1 | — | — | — | 13.6 |

TABLE 19

De-gelling temperatures for blends of oleyl 20EO and oleyl 20EO n-octanoyl ester.

| [Surfactant] ratio | | De-gelling |
|---|---|---|
| Oleyl 20 EO | Oleyl 20EO octanoyl ester | temperature/° C. 40% w/w |
| 1 | 0.0 | 66.3 |
| 0.75 | 0.25 | 58.0 |
| 0.5 | 0.5 | 24.0 |
| 0.25 | 0.75 | 26.3 |
| 0 | 1.0 | 16.5 |

Cloud points—were measured using the same method as in Example 1.

TABLE 20

Cloud point temperatures for blends of oleyl 20EO and oleyl 20EO n-hexanoyl ester.

| [Surfactant]/% | | |
|---|---|---|
| Oleyl 20 EO | Oleyl 20EO hexanoyl ester | Cloud point/° C. 1% |
| 1 | 0 | >95.0 |
| 0.5 | 0.5 | 72.5 |
| 0.25 | 0.75 | 32.0 |
| 0 | 1 | 28.0 |

Oleyl 20 Ethoxylate with n-Hexanoyl, n-Octanoyl and 2-Ethyl Hexanoyl Ester Caps—Biological Effect on Nicosulfuron.

The biological efficacies of 1:1 blends of an oleyl 20 ethoxylate uncapped surfactant with oleyl 20E ethoxylate surfactants with hexanoyl, n-octanoyl or 2-ethyl hexanoyl ester caps as adjuvants for the herbicide nicosulfuron were tested in a glasshouse using the same method as for 'Example 1' but against just one weed species and at 0.2% w/v tital adjuvant concentration. The weed species and its BBCH growth stage at spraying was *Chenopodium album* (CHEAL; growth stage 15).

TABLE 21

Mean control results for nicosulfuron with different blends on *chenopodium album*.

| [Oleyl 20EO]/% | Surfactant cap | [capped surfactant]/% | Mean control/% 15 g ai/ha | 60 g ai/ha |
|---|---|---|---|---|
| 0.2 | — | 0 | 76.8 | 71.7 |
| 0.1 | n-hexanoyl | 0.1 | 73.3 | 73.3 |
| 0.1 | n-octanoyl | 0.1 | 73.3 | 73.3 |
| 0.1 | 2-ethylhexanoyl | 0.1 | 76.7 | 71.7 |

Oleyl 20 Ethoxylate with n-Hexanoyl, n-Octanoyl and 2-Ethyl Hexanoyl Ester Caps—Biological Effect on Pinoxaden.

The efficacy of 1:1 blends of oleyl 20EO with oleyl 20EO with either n-hexanoyl, n-octanoyl or 2-ethyl hexanoyl ester caps as adjuvants for the herbicide pinoxaden was tested in a glasshouse against two weed species, sown into standard soil in pots and cultivated under controlled conditions in a glasshouse (20/16° C. day/night; 16 hours light; 65% humidity). Pinoxaden was added to the spray tank as a standard EC (emulsifiable concentrate) formulation. The plants were sprayed with pinoxaden at rates of 7.5 or 15 grams of pesticide per hectare using a laboratory track sprayer which delivered the aqueous spray composition at a rate of 200 litres per hectare, using a flat fan nozzle (Teejet 11002VS) at 2 bar. The spray solutions also contained the oleyl 20EO alone or in the 1:1 blends with the capped surfactants. The adjuvants were added to the spray solution at a total surfactant rate of 0.2% w/v. All spray solutions also contained 10% w/w of iso-propanol. The weed species and their BBCH growth stage at spraying were *Avena fatua* (AVEFA; growth stage 13) and *Setaria viridis* (SETVI; growth stage 13). Each spray test was replicated three times. The test plants were then grown in a glasshouse under controlled conditions (20/16° C. day/night; 16 hours light; 65% humidity) and watered twice a day. The efficacy of the herbicide was assessed visually and expressed as a percentage of the leaf area killed. Samples were assessed at a time period of 21 days following application.

TABLE 22

Mean control results for pinoxaden with different blends on *avena fatua*.

| [Oleyl 20EO]/% | Surfactant cap | [capped surfactant]/% | Mean control/% | |
|---|---|---|---|---|
| | | | 7.5 g ai/ha | 15 g ai/ha |
| 0.2 | — | 0 | 65.0 | 86.7 |
| 0.1 | n-hexanoyl | 0.1 | 73.3 | 91.7 |
| 0.1 | n-octanoyl | 0.1 | 42.7 | 91.7 |
| 0.1 | 2-ethylhexanoyl | 0.1 | 75.0 | 91.7 |

TABLE 23

Mean control results for pinoxaden with different blends on *setaria viridis*.

| [Oleyl 20EO]/% | Surfactant cap | [capped surfactant]/% | Mean control/% | |
|---|---|---|---|---|
| | | | 7.5 g ai/ha | 15 g ai/ha |
| 0.2 | — | 0 | 98.0 | 98.3 |
| 0.1 | n-hexanoyl | 0.1 | 98.3 | 100.0 |
| 0.1 | n-octanoyl | 0.1 | 97.0 | 99.0 |
| 0.1 | 2-ethylhexanoyl | 0.1 | 97.3 | 99.7 |

Oleyl 20 Ethoxylate with n-Hexanoyl, n-Octanoyl and 2-Ethyl Hexanoyl Ester Caps—Biological Effect on Fomesafen.

The efficacy of 1:1 blends of oleyl 20EO with oleyl 20EO with either n-hexanoyl, n-octanoyl or 2-ethyl hexanoyl ester caps as adjuvants for the herbicide fomesafen (as the sodium salt) was tested in a glasshouse against one weed species, sown into standard soil in pots and cultivated under controlled conditions in a glasshouse (24/18° C. day/night; 16 hours light, 65% humidity). Fomesafen sodium salt was added to the spray tank as a standard SL (soluble concentrate) formulation. The plants were sprayed with fomesafen (sodium salt) at rates of 100 or 200 grams of sodium fomesafen per hectare using a laboratory track sprayer which delivered the aqueous spray composition at a rate of 200 litres per hectare, using a flat fan nozzle (Teejet 11002VS) at 2 bar. The spray solutions also contained the oleyl 20EO alone or in the 1:1 blends with the capped surfactants. The adjuvants were added to the spray solution at a total surfactant rate of 0.2% w/v. All spray solutions also contained 10% w/w of iso-propanol. The weed specie and its BBCH growth stage at spraying was *Chenopodium album* (CHEAL; growth stage 15). Each spray test was replicated three times. The test plants were then grown in a glasshouse under controlled conditions (24/18° C. day/night; 16 hours light; 65% humidity) and watered twice a day. The efficacy of the herbicide was assessed visually and expressed as a percentage of the leaf area killed. Samples were assessed at a time period of 21 days following application.

TABLE 24

Mean control results for fomesafen (sodium salt) with different blends on *chenopodium album*.

| [Oleyl 20EO]/% | Surfactant cap | [capped surfactant]/% | Mean control/% | |
|---|---|---|---|---|
| | | | 100 g ai/ha | 200 g ai/ha |
| 0.2 | — | 0 | 68.3 | 68.3 |
| 0.1 | n-hexanoyl | 0.1 | 70.0 | 75.0 |
| 0.1 | n-octanoyl | 0.1 | 75.0 | 76.7 |
| 0.1 | 2-ethylhexanoyl | 0.1 | 71.7 | 76.7 |

Oleyl 20 Ethoxylate with n-Hexanoyl, n-Octanoyl and 2-Ethyl Hexanoyl Ester Caps—Biological Effect on Mesotrione.

The efficacy of 1:1 blends of oleyl 20EO with oleyl 20EO with either n-hexanoyl, n-octanoyl or 2-ethyl hexanoyl ester caps as adjuvants for the herbicide mesotrione was tested in a glasshouse against three weed species sown into standard soil in pots and cultivated under controlled conditions in a glasshouse (24/18° C. day/night; 16 hours light; 65% humidity). Mesotrione was added to the spray tank as a standard SC (suspension concentrate) formulation. The plants were sprayed with mesotrione at rates of 30 or 60 grams of pesticide per hectare using a laboratory track sprayer which delivered the aqueous spray composition at a rate of 200 litres per hectare, using a flat fan nozzle (Teejet 11002VS) and an application volume of 200 litre/ha (at 2 bar). The spray solutions also contained the oleyl 20EO alone or in 1:1 blends with the capped surfactants. The adjuvants were added to the spray solution at a total surfactant rate of 0.2% w/v. All spray solutions also contained 10% w/w of iso-propanol. The weed species and their BBCH growth stage at spraying were *Brachiaria platyphylla* (BRAPL; growth stage 12-13), *Commelina benghalensis* (COMBE; growth stage 12-14) and *Digitaria sanguinalis* (DIGSA; growth stage 13). Each spray test was replicated three times. The test plants were then grown in a glasshouse under controlled conditions (24/18° C. day/night; 16 hours light; 65% humidity) and watered twice a day. The efficacy of the herbicide was assessed visually and expressed as a percentage of the leaf area killed. Samples were assessed at a time period of 21 days following application

TABLE 25

Mean control results for mesotrione with different blends on *digitaria sanguinalis*.

| [Oleyl 20EO]/% | Surfactant cap | [capped surfactant]/% | Mean control/% | |
|---|---|---|---|---|
| | | | 30 g ai/ha | 60 g ai/ha |
| 0.2 | — | 0 | 68.3 | 75.0 |
| 0.1 | n-hexanoyl | 0.1 | 63.3 | 75.0 |
| 0.1 | n-octanoyl | 0.1 | 65.0 | 71.7 |
| 0.1 | 2-ethylhexanoyl | 0.1 | 71.7 | 75.0 |

TABLE 26

Mean control results for mesotrione with different blends on *Brachiaria platyphylla*.

| [Oleyl 20EO]/% | Surfactant cap | [capped surfactant]/% | Mean control/% 30 g ai/ha | Mean control/% 60 g ai/ha |
|---|---|---|---|---|
| 0.2 | — | 0 | 56.7 | 71.7 |
| 0.1 | n-hexanoyl | 0.1 | 51.7 | 66.7 |
| 0.1 | n-octanoyl | 0.1 | 60.0 | 66.7 |
| 0.1 | 2-ethylhexanoyl | 0.1 | 58.3 | 68.3 |

TABLE 27

Mean control results for mesotrione with different blends on *Commelina benghalensis*.

| [Oleyl 20EO]/% | Surfactant cap | [capped surfactant]/% | Mean control/% 30 g ai/ha | Mean control/% 60 g ai/ha |
|---|---|---|---|---|
| 0.2 | — | 0 | 66.7 | 76.7 |
| 0.1 | n-hexanoyl | 0.1 | 68.3 | 82.5 |
| 0.1 | n-octanoyl | 0.1 | 68.3 | 76.7 |
| 0.1 | 2-ethylhexanoyl | 0.1 | 73.3 | 78.3 |

The results show that blending the uncapped and the capped versions of the surfactants does not lead to any significant reduction in biological activity compared to the uncapped surfactant alone. In some cases, incorporation of the capped surfactant improved the biological activity; and in some cases the blends were marginally more active than the non-blended surfactants.

EXAMPLE 5

This example demonstrates that surfactant blends related to the present invention can be incorporated into agrochemical formulations, such as a suspension. Surfactants and blends of surfactants were incorporated into a 200 g/l suspension of azoxystrobin in water. Brij™ O20 (uncapped oleyl 20 ethoxylate) and oleyl 20 ethoxylate with an hexanoate cap were included in the suspension at a variety of ratios to each other. The formulations were prepared by the addition of water and surfactant to the following stock suspension:

TABLE 28

| Component | Concentration/% w/w |
|---|---|
| Azoxystrobin | 50.0 |
| Morwet D425 | 3.39 |
| Anti-foam | 0.51 |
| Anti-settling agent | 0.13 |
| Bactericide | 0.09 |

20 g quantities of the stock suspension (of volume mean diameter 1-2 μm) were mixed with 19.75 g deionized water and 12.75 g total of surfactant to give a suspension containing 200 g/l azoxystrobin and 255 g/l total surfactant (30% w/w in the aqueous phase alone). The surfactants rates used and the properties observed and measured (see below) are tabulated in Table 29.

TABLE 29

| Sample | [Brij O20]/ (g/l) | Oleyl 20 ethoxylate-hexanoate/ (g/l) | Ratio | State 20 +/−2° C. | De-gelling temperature/° C. |
|---|---|---|---|---|---|
| A | 255 | 0 | — | Gelled | 41 |
| B | 127.5 | 127.5 | 1:1 | Mobile fluid | 11 |
| C | 63.7 | 191.3 | 1:3 | Mobile fluid | <5 |
| D | 0 | 255 | — | Mobile fluid | <5 |

After mixing, samples A and B were stored in an oven at 55° C. to de-gel the sample and then placed on rollers whilst still warm to allow good mixing. Samples C and D were left on rollers at ambient laboratory temperature to ensure good mixing. After 2 days, the samples were allowed to rest to ambient laboratory temperature (20+/−2° C.) and a visual assessment was made as to whether each sample was gelled or liquid. Gelled samples were those that did not flow under their own weight when the bottle was tilted. Mobile fluid samples readily flowed when the bottle was tilted. Temperature sweeps were made on a Bohlin™ Gemini™ rheometer to detect any gel points between 5 and 60° C. Using a cup and bob geometry, the elastic and loss moduli of suspensions A-D were recorded at an oscillatory strain of 0.0005 and a frequency of 1 Hz. A temperature ramp was applied that reduced or increased the temperature at 0.92° C./minute. Samples B-D were run from 5° C. up to 60° C. since they were already liquid at room temperature and could be easily and accurately placed in the instrument. Sample A, which was gelled at room temperature, was run from 60 down to 5° C., having previously been warmed to fully de-gel the sample to a liquid form again to allow placing the sample in the instrument. Gelation was taken to be the point where the elastic modulus rapidly rose through several orders of magnitude over an interval of from 1 to 2° C.

Regarding Table 29, both the capped alone (Sample D) and the 1:3 ratio of un-capped to capped (Sample C) showed no rapid change in modulus with temperature in the temperature range studied and so showed no gelation even at 5° C. Whilst the 1:1 ratio (Sample B) showed a rapid change in modulus at and just below 11° C. showing that this sample de-gelled at that temperature on heating and that this de-gelling was at a much lower temperature than the un-capped alone sample, which de-gelled at the much higher transition temperature of 41° C.

In summary, the sample (A) containing Brij™ O20 alone was significantly gelled at room temperature, but by incorporating the oleyl 20EO n-hexanoate cap at a ratio of 1:1 (Sample B) or 1:3 (Sample C) the suspension was not gelled at room temperature. This confirmed that by blending the un-capped and capped analogues the flow properties of the suspensions (i.e. the properties of the aqueous phases of the compositions) may be readily modified.

EXAMPLE 6

This example provides de-gelling, cloud point and adjuvancy data for dodecyl 23 ethoxylate with n-hexyl cap and hexadecyl 20 ethoxylate with n-hexyl cap Cloud points were measured as described in example 1 for 1% aqueous solutions of the capped and uncapped surfactants both individually and as blends (see Table 30). Degelling temperatures were also measured as outlined in example 1 for 25, 30, 35 and 40% aqueous solutions of the capped and uncapped surfactants both individually and as blends (see Table 31).

TABLE 30

Cloud points for blends of dodecyl 23EO and dodecyl 23OEO n-ether cap and for blends of hexadecyl 20EO and hexadecyl 20EO n-ether cap.

| [Dodecyl 23 EO]/% | [Dodecyl 23EO n-hexyl ether]/% | Cloud point/° C. |
|---|---|---|
| 1 | 0 | >90.0 |
| 0.75 | 0.25 | >90.0 |
| 0.5 | 0.5 | >90 |
| 0.25 | 0.75 | 79.1 |
| 0 | 1 | 67.2 |

| [Hexadecyl 20 EO]/% | [Hexadecyl 20EO n-hexyl ether]/% | Cloud point/° C. |
|---|---|---|
| 1 | 0 | >90.0 |
| 0.75 | 0.25 | >90.0 |
| 0.5 | 0.5 | 87.6 |
| 0.25 | 0.75 | 72.2 |
| 0 | 1 | 55.9 |

These data (Table 31) show that by blending capped and uncapped surfactants the de-gelling temperature can be reduced compared to that of the uncapped surfactant alone. This is most efficacious in the total surfactant concentration range of 25-30% w/w where the de-gelling temperature is below room temperature and thus a formulation containing this level of surfactant in its aqueous phase is not gelled at ambient. In all cases, the cloud point is acceptable for these blends (Table 30) but in some cases the cloud point of the capped is low but shows better biological activity (see below) than the uncapped version. In this case, blending in some uncapped surfactant with a capped surfactant increases the cloud point without significantly gelling the system.

TABLE 31

De-gelling temperatures for blends of Oleyl 20EO and Oleyl 20EO n-ether caps.

Ratio of uncapped: capped (mass)

| Dodecyl 23 EO | Dodecyl 23EO n-hexyl ether | Total surfactant concentration/% w/w | | | |
|---|---|---|---|---|---|
| | | 25 | 30 | 35 | 40 |
| | | De-gelling temperature/° C. | | | |
| 1 | 0 | 21.1 | 38.6 | 55.0 | 64.3 |
| 0.75 | 0.25 | <5 | 25.0 | 38.4 | 53.1 |
| 0.5 | 0.5 | <5 | 10.6 | 24.4 | 26.8 |
| 0.25 | 0.75 | <5 | <5 | 7.8 | 19.1 |
| 0 | 1 | <5 | <5 | <5 | 7.4 |

Ratio of uncapped: capped (mass)

| Hexadecyl 20 EO | Hexadecyl 20EO pentyl ether | Total surfactant concentration/% w/w | | | |
|---|---|---|---|---|---|
| | | 25 | 30 | 35 | 40 |
| | | De-gelling temperature/° C. | | | |
| 1 | 0 | 23.2 | 48.7 | 66.1 | 74.1 |
| 0.75 | 0.25 | <5 | 36.2 | 53.6 | 62.1 |
| 0.5 | 0.50 | <5 | 21.6 | 38.2 | 48.7 |
| 0.25 | 0.75 | <5 | 8.5 | 22.5 | 32.3 |
| 0 | 1 | <5 | <5 | 5.7 | 19.6 |

This example demonstrates that surfactant blends according to the present invention may be incorporated into agrochemical formulations, such as suspensions. Surfactants and blends of surfactants were incorporated into a 200 g/l suspension of azoxystrobin in water. Uncapped oleyl 20 ethoxylate and oleyl 20 ethoxylate with butyl, pentyl or benzyl caps were included in the suspension at a variety of ratios to each other. The formulations were prepared as in example 5. Degelling temperatures of the suspension formulations were determined as described in example 5.

TABLE 32

Degelling temperatures of Azoxystrobim suspensions containing dodecyl 23EO and hexadecyl 20EO and their n-hexyl cpped counterparts

| Sample | [Dodecyl 23 EO]/ (g/l) | [Dodecyl 23EO n-butyl ether]/ (g/l) | Ratio | State 20 +/−2° C. | De-gelling temperature/ ° C. |
|---|---|---|---|---|---|
| Q | 255 | 0 | — | Gelled | 31.5 |
| R | 127.5 | 127.5 | 1:1 | Mobile fluid | <5.0 |
| S | 0 | 255 | — | Mobile fluid | <5.0 |

| Sample | [Hexadecyl 20 EO]/ (g/l) | [Hexadecyl 20EO n-pentyl ether]/ (g/l) | Ratio | State 20 +/−2° C. | De-gelling temperature/ °C. |
|---|---|---|---|---|---|
| T | 255 | 0 | — | Gelled | >50.0 |
| U | 127.5 | 127.5 | 1:1 | Mobile fluid | 16.0 |
| V | 0 | 255 | — | Mobile fluid | <5.0 |

Regarding Table 32, the samples containing the capped surfactants alone (Samples S and V) and the 1:1 ratio of un-capped dodecyl 23 EO to n-hexyl capped dodecyl 23 EO sample (Sample R) showed no rapid change in modulus with temperature in the temperature range studied and so showed no gelation even at 5° C. With the exception of the sample containing hexadecyl 20EO alone, which degelled at a temperature above 50° C.), all other compositions showed a rapid change in modulus at a certain degelling temperature showing that those samples de-gelled at that temperature on heating and that this de-gelling was at a much lower temperature than the un-capped alone samples.

In summary, the samples (0 and T) containing uncapped dodecyl 20 EO or uncapped hexadecyl 20EO alone were significantly gelled at room temperature, but by incorporating their corresponding n-ether caps cap at a ratio of 1:1 the suspensions were not gelled at room temperature. This confirmed that by blending the un-capped and capped analogues the flow properties of the suspensions (i.e. the properties of the aqueous phases of the compositions) may be readily modified.

EXAMPLE 7

Dodecyl and hexadecyl ethoxylate with n-hexyl ether caps—biological effect on pinoxaden.
Dodecyl 23EO and hexadecyl 20EO were capped with an n-hexyl ether cap. The efficacy of 1:1 blends of these with their uncapped counterparts were tested as adjuvants for the herbicide pinoxaden was tested in a glasshouse against two weed species, sown into standard soil in pots and cultivated under controlled conditions in a glasshouse (20/16° C. day/night; 16 hours light; 65% humidity). Pinoxaden was added to the spray tank as a standard EC (emulsifiable concentrate) formulation. The plants were sprayed with pinoxaden at a.i. rates of 7.5 or 15 grams per hectare using a laboratory track sprayer which delivered the aqueous spray composition at a rate of 200 litres per hectare, using a flat fan nozzle (Teejet 11002VS) at 2 bar. The spray solutions tested included the capped and uncapped alone or in the 1:1 blends with the capped surfactants. The adjuvants were added to the spray solution at a total surfactant rate of 0.2% w/v. All spray solutions also contained 10% w/w of iso-propanol. The weed species and their BBCH growth stage at spraying was *Avena fatua* (AVEFA; growth stage 12). Each spray test was replicated three times. The test plants were then grown in a glasshouse under controlled conditions (20/16° C. day/night; 16 hours light; 65% humidity) and watered twice a day. The efficacy of the herbicide was assessed visually and expressed as a percentage of the leaf area killed. Samples were assessed at a time period of 21 days following application.

TABLE 33

Mean control results for pinoxaden with different blends on *avena fatua*.

| Uncapped surfactant | [Uncapped surfactant]/% | Surfactant cap | [capped surfactant]/% | Mean control/% 15 g ai/ha |
|---|---|---|---|---|
| Dodecyl 23EO | 0.2 | n-hexyl | 0 | 83.3 |
| Dodecyl 23EO | 0.1 | n-hexyl | 0.1 | 85 |
| Dodecyl 23EO | 0 | n-hexyl | 0.2 | 86 |
| Hexadecyl 20EO | 0.2 | n-hexyl | 0 | 90.3 |
| Hexadecyl 20EO | 0.1 | n-hexyl | 0.1 | 95.3 |
| Hexadecyl 20EO | 0 | n-hexyl | 0.2 | 93.3 |

The results in Table 33 show that blending the uncapped and the capped versions of the surfactants does not lead to any significant reduction in biological activity compared to the uncapped surfactant alone. In some cases, incorporation of the capped surfactant improved the biological activity; and in some cases the blends were marginally more active than the non-blended surfactants.

EXAMPLE 8

This example provides de-gelling, cloud point and adjuvancy data for oleyl 20 ethoxylate with n-butyl, n-pentyl or benzyl ether caps end capped oleyl 20 ethoxylate. Cloud points were measured as described in example 1 for 1% aqueous solutions of the capped and uncapped surfactants both individually and as blends. Degelling temperatures were also measured as outlined in example 1 for 25, 30, 35 and 40% aqueous solutions o of the capped and uncapped surfactants both individually and as blends.

TABLE 34

Cloud points for blends of Oleyl 20EO and Oleyl 20EO n-ether caps.

| [Oleyl 20 EO]/% | [Oleyl 20EO n-butyl ether]/% | Cloud point/° C. |
|---|---|---|
| 1 | 0 | >90.0 |
| 0.75 | 0.25 | >90.0 |
| 0.5 | 0.5 | >90.0 |
| 0.25 | 0.75 | 81.2 |
| 0 | 1 | 71.0 |

| [Oleyl 20 EO]/% | [Oleyl 20EO n-pentyl ether]/% | Cloud point/° C. |
|---|---|---|
| 1 | 0 | >90.0 |
| 0.75 | 0.25 | >90.0 |
| 0.5 | 0.5 | 84.1 |
| 0.25 | 0.75 | 72.3 |
| 0 | 1 | 55.9 |

| [Oleyl 20 EO]/% | [Oleyl 20EO n-benzyl ether]/% | Cloud point/° C. |
|---|---|---|
| 1 | 0 | >90.0 |
| 0.75 | 0.25 | >90.0 |
| 0.5 | 0.5 | 74.4 |
| 0.25 | 0.75 | 55.4 |
| 0 | 1 | 38.7 |

The data in Table 35 show that by blending capped and uncapped surfactants the de-gelling temperature can be reduced compared to that of the uncapped surfactant alone. This is most efficacious in the total surfactant concentration range of 25-30% w/w where the de-gelling temperature is below room temperature and thus a formulation containing this level of surfactant in its aqueous phase is not gelled at ambient. In all cases, the cloud point is acceptable (Table 34) for these blends but in some cases the cloud point of the capped is low but shows better biological activity (see below) than the uncapped version. In this case, blending in some uncapped with a capped surfactant increases the cloud point without significantly gelling the system.

TABLE 35

De-gelling temperatures for blends of
Oleyl 20EO and Oleyl 20EO n-ether caps.

| Ratio of uncapped: capped (mass) | | Total surfactant concentration/% w/w | | | |
|---|---|---|---|---|---|
| Oleyl 20 EO | Oleyl 20EO butyl ether | 25 | 30 | 35 | 40 |
| | | De-gelling temperature/° C. | | | |
| 1 | 0 | 23.3 | 40.9 | 56.7 | 63.1 |
| 0.75 | 0.25 | <5 | 33.9 | 48.0 | 57.5 |
| 0.5 | 0.5 | <1 | 35.1 | 39.2 | 49.5 |
| 0.25 | 0.75 | <5 | 30.1 | 35.6 | 43.8 |
| 0 | 1 | <5 | 27.3 | 34.0 | 36.1 |

| Ratio of uncapped: capped (mass) | | Total surfactant concentration/% w/w | | | |
|---|---|---|---|---|---|
| Oleyl 20 EO | Oleyl 20EO pentyl ether | 25 | 30 | 35 | 40 |
| | | De-gelling temperature/° C. | | | |
| 1 | 0 | 23.3 | 40.9 | 56.7 | 63.1 |
| 0.75 | 0.25 | <5 | 33.9 | 48.0 | 57.5 |
| 0.5 | 0.5 | <5 | 35.1 | 39.2 | 49.5 |
| 0.25 | 0.75 | <5 | 30.1 | 35.6 | 43.8 |
| 0 | 1 | <5 | 27.3 | 34.0 | 36.1 |

| Ratio of uncapped: capped (mass) | | Total surfactant concentration/% w/w | | | |
|---|---|---|---|---|---|
| Oleyl 20 EO | Oleyl 20EO benzyl ether | 25 | 30 | 35 | 40 |
| | | De-gelling temperature/° C. | | | |
| 1 | 0 | 23.3 | 40.9 | 56.7 | 63.1 |
| 0.75 | 0.25 | <5 | 35.3 | 47.1 | 52.1 |
| 0.5 | 0.5 | <5 | 17.5 | 35.9 | 36.6 |
| 0.25 | 0.75 | <5 | 5 | 18.1 | 29.6 |
| 0 | 1 | <5 | <5 | 5 | 15.1 |

This example demonstrates that surfactant blends related to the present invention can be incorporated into agrochemical formulations, such as a suspension. Surfactants and blends of surfactants were incorporated into a 200 g/l suspension of azoxystrobin in water. Uncapped oleyl 20 ethoxylate) and oleyl 20 ethoxylate with butyl, pentyl or benzyl caps were included in the suspension at a variety of ratios to each other. The formulations were prepared as in example 5. Degelling temperatures of the suspension formulations were determined as described in example 5.

TABLE 36

| Sample | [Oleyl 20 EO]/(g/l) | [Oleyl 20EO n-butyl ether]/(g/l) | Ratio | State 20 +/−2° C. | De-gelling temperature/° C. |
|---|---|---|---|---|---|
| E | 255 | 0 | — | Gelled | 34.6 |
| F | 127.5 | 127.5 | 1:1 | Gelled | 26.9 |
| G | 63.7 | 191.3 | 1:3 | Gelled | 21.7 |
| H | 0 | 255 | — | Mobile fluid | 16.7 |

| Sample | [Oleyl 20 EO]/(g/l) | [Oleyl 20EO n-pentyl ether]/(g/l) | Ratio | State 20 +/−2° C. | De-gelling temperature/°C. |
|---|---|---|---|---|---|
| E | 255 | 0 | — | Gelled | 34.6 |
| J | 127.5 | 127.5 | 1:1 | Gelled | 22.2 |
| K | 63.7 | 191.3 | 1:3 | Mobile fluid | 12.9 |
| L | 0 | 255 | — | Mobile fluid | <5.0 |

TABLE 36-continued

| Sample | [Oleyl 20 EO]/(g/l) | [Oleyl 20EO n-benzyl ether]/(g/l) | Ratio | State 20 +/−2° C. | De-gelling temperature/° C. |
|---|---|---|---|---|---|
| E | 255 | 0 | — | Gelled | 34.6 |
| N | 127.5 | 127.5 | 1:1 | Mobile fluid | 10.9 |
| O | 63.7 | 191.3 | 1:3 | Mobile fluid | <5.0 |
| P | 0 | 255 | — | Mobile fluid | <5.0 |

Regarding Table 36, the samples containing the capped surfactants alone (Samples H, L and P)) and the 1:3 ratio of un-capped to benzyl capped sample (Sample 0) showed no rapid change in modulus with temperature in the temperature range studied and so showed no gelation even at 5° C. All other compositions showed a rapid change in modulus at a certain degelling temperature showing that this sample de-gelled at that temperature on heating and that this de-gelling was at a much lower temperature than the un-capped alone sample, which de-gelled at the much higher transition temperature of 34.6° C.

In summary, the sample (E) containing uncapped Oleyl 20 EO alone was significantly gelled at room temperature, but by incorporating the oleyl 20EO n-ether caps cap at a sufficiently high ratio of 1:1 or 1:3 the suspension was not gelled at room temperature. This confirmed that by blending the un-capped and capped analogues the flow properties of the suspensions (i.e. the properties of the aqueous phases of the compositions) may be readily modified.

EXAMPLE 9

Oleyl 20 Ethoxylate with n-Butyl, n-Pentyl and n-Benzyl Ether Caps—Biological Effect on Pinoxaden.

Oleyl 20EO was capped with -butyl, n-pentyl and n-benzyl caps. The efficacy of 1:1 blends of these with their uncapped counterparts were tested as adjuvants for the herbicide pinoxaden was tested in a glasshouse against two weed species, sown into standard soil in pots and cultivated under controlled conditions in a glasshouse (20/16° C. day/night; 16 hours light; 65% humidity). Pinoxaden was added to the spray tank as a standard EC (emulsifiable concentrate) formulation. The plants were sprayed with pinoxaden at a.i. rates of 7.5 or 15 grams per hectare using a laboratory track sprayer which delivered the aqueous spray composition at a rate of 200 litres per hectare, using a flat fan nozzle (Teejet 11002VS) at 2 bar. The spray solutions tested included the capped and uncapped alone or in the 1:1 blends with the capped surfactants. The adjuvants were added to the spray solution at a total surfactant rate of 0.2% w/v. All spray solutions also contained 10% w/w of iso-propanol. The weed species and their BBCH growth stage at spraying was *Avena fatua* (AVEFA; growth stage 12). Each spray test was replicated three times. The test plants were then grown in a glasshouse under controlled conditions (20/16° C. day/night; 16 hours light; 65% humidity) and watered twice a day. The efficacy of the herbicide was assessed visually and expressed as a percentage of the leaf area killed. Samples were assessed at a time period of 21 days following application.

TABLE 37

Mean control results for pinoxaden with different blends on *avena fatua*.

| Uncapped surfactant | [Uncapped surfactant]/% | Surfactant cap | [capped surfactant]/% | Mean control/% 15 g ai/ha |
|---|---|---|---|---|
| Oleyl 20EO | 0.2 | n-butyl | 0 | 92.7 |
| Oleyl 20EO | 0.1 | n-butyl | 0.1 | 89.3 |
| Oleyl 20EO | 0 | n-butyl | 0.2 | 96.3 |
| Oleyl 20EO | 0.2 | n-pentyl | 0 | 92.7 |
| Oleyl 20EO | 0.1 | n-pentyl | 0.1 | 96.7 |
| Oleyl 20EO | 0 | n-pentyl | 0.2 | 87.7 |
| Oleyl 20EO | 0.2 | n-benzyl | 0 | 92.7 |
| Oleyl 20EO | 0.1 | n-benzyl | 0.1 | 96.0 |
| Oleyl 20EO | 0 | n-benzyl | 0.2 | 89.3 |

The results in Table 37 show that blending the uncapped and the capped versions of the surfactants does not lead to any significant reduction in biological activity compared to the uncapped surfactant alone. In some cases, incorporation of the capped surfactant improved the biological activity; and in some cases the blends were marginally more active than the non-blended surfactants.

What is claimed is:

1. A composition comprising:
   (i) water,
   (ii) a hydroxy-capped aliphatic ethoxylate of formula (Ia):

   $$R_a\text{—O—}[EO]_{na}\text{—H} \quad (Ia),$$

wherein $R_a$ is linear or singly or multiply branched $C_{8-20}$ alkyl, or $C_{8-20}$ alkenyl; and $n_a$ is from 5 to 25,
   (iii) a non-hydroxy-capped aliphatic ethoxylate of formula (Ib):

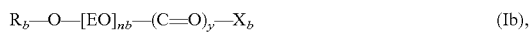
   $$R_b\text{—O—}[EO]_{nb}\text{—(C=O)}_y\text{—}X_b \quad (Ib),$$

wherein $R_b$ is linear or singly or multiply branched $C_{8-20}$ alkyl, or $C_{8-20}$ alkenyl; $n_b$ is from 5 to 25; y is 0 or 1; and $X_b$ comprises from 4 to 10 carbon atoms and is an aliphatic or an aromatic group, and
   (iv) an agrochemical,
   wherein the molar ratio of (ii) to (iii) is from 9:1 to 1:9, and wherein (ii) and (iii) makes a blend and the blend of (ii) and (iii) makes up 20 to 40% w/w of the composition.

2. The composition of claim 1, wherein the agrochemical is in a concentration of from 50 g/l to 600 g/l.

3. The composition of claim 1, wherein the hydroxy-capped aliphatic exthoxylate is in a concentration of the from 100 g/l to 600 g/l.

4. The composition of claim 1, wherein the composition is an SC (suspension concentrate); an SL (soluble liquid); an EW (emulsion in water); an SE (suspension-emulsion); or a CS (capsule suspension).

5. The composition of claim 1, wherein $n_a$ is 20.

6. The composition of claim 1, wherein the mean value of $n_a$ for all of the hydroxy-capped aliphatic ethoxylate of formula (Ia) in the composition is about 20.

7. The composition of claim 6, wherein $R_a$ is oleyl.

8. The composition of claim 1, wherein $n_b$ is 20.

9. The composition of claim 1, wherein the mean value of $n_b$ for all of the hydroxy-capped aliphatic ethoxylate of formula (Ib) in the composition is about 20.

10. The composition of claim 9, wherein $R_b$ is oleyl.

11. The composition of claim 10, wherein $X_b$ is n-hexyl, benzoyl, n-hexanoyl, n-octanoyl, or 2-ethylhexanoyl.

12. The composition of claim 11, wherein $X_b$ is n-hexyl.

13. The composition of claim 12, wherein y is 0.

14. The composition of claim 9, wherein $X_b$ is n-hexyl, benzoyl, n-hexanoyl, n-octanoyl, or 2-ethylhexanoyl.

15. The composition of claim 14, wherein $X_b$ is n-hexyl.

16. The composition of claim 1, wherein the agrochemical makes up 20 to 40% w/w of the composition.

17. A composition comprising:
    (i) water,
    (ii) a hydroxy-capped aliphatic ethoxylate of formula (Ia):

    $$R_a\text{—O—}[EO]_{na}\text{—H} \quad (Ia),$$

wherein $R_a$ is linear or singly or multiply branched $C_{8-20}$ alkyl, or $C_{8-20}$ alkenyl;
    and $n_a$ is from 5 to 25,
    (iii) a non-hydroxy-capped aliphatic ethoxylate of formula (Ib):

    $$R_b\text{—O—}[EO]_{nb}\text{—(C=O)}_y\text{—}X_b \quad (Ib),$$

wherein $R_b$ is linear or singly or multiply branched $C_{8-20}$ alkyl, or $C_{8-20}$ alkenyl; $n_b$ is from 5 to 25; y is 0 or 1; and $X_b$ comprises from 4 to 10 carbon atoms and is an aliphatic or an aromatic group, and
    (iv) an agrochemical,
    wherein (1) at least one of $R_a$ or $R_b$ is oleyl and/or (2) $R_a=R_b$ and $n_a=n_b$, and wherein (ii) and (iii) makes a blend and the blend of (ii) and (iii) makes up 20 to 40% w/w of the composition.

18. The composition of claim 17, wherein $R_b$ is oleyl.

19. The composition of claim 17, wherein:
    $R_a$ is oleyl;
    $n_a$ is about 20;
    $R_b$ is oleyl;
    $n_b$ is about 20; and
    $X_b$ is n-hexyl, benzoyl, n-hexanoyl, n-octanoyl, or 2-ethylhexanoyl.

20. The composition of claim 19, wherein $n_a$ is 20, $n_b$ is 20, y is 0, and $X_b$ is n-hexyl.

21. The composition of claim 17, wherein $R_a=R_b$ and $n_a=n_b$.

22. The composition of claim 17, wherein $R_a$ is oleyl.

23. A composition comprising:
    (i) water,
    (ii) a hydroxy-capped aliphatic ethoxylate of formula (Ia):

    $$R_a\text{—O—}[EO]_{na}\text{—H} \quad (Ia),$$

wherein $R_a$ is linear or singly or multiply branched $C_{8-20}$ alkyl, or $C_{8-20}$ alkenyl;
    and $n_a$ is from 5 to 25,
    (iii) a non-hydroxy-capped aliphatic ethoxylate of formula (Ib):

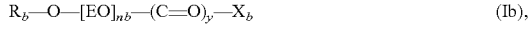
    $$R_b\text{—O—}[EO]_{nb}\text{—(C=O)}_y\text{—}X_b \quad (Ib),$$

wherein $R_b$ is linear or singly or multiply branched $C_{8-20}$ alkyl, or $C_{8-20}$ alkenyl; $n_b$ is from 5 to 25; y is 0 or 1; and $X_b$ comprises from 4 to 10 carbon atoms and is an aliphatic or an aromatic group, and
    (iv) an agrochemical,
    wherein the agrochemical makes up 20 to 40% w/w of the composition, and wherein (ii) and (iii) makes a blend and the blend of (ii) and (iii) makes up 20 to 40% w/w of the composition; and
    wherein (1) the de-gelling temperature of the composition is below room temperature and/or (2) the cloud point of the composition is above 49.9° C.

24. The composition of claim 23, wherein the cloud point of the composition is above 49.9° C.

25. The composition of claim 22, wherein ratio (ii) to (iii) is 3:1 to 1:3 w/w.

26. The composition of claim 23, wherein the de-gelling temperature of the composition is below room temperature.

\* \* \* \* \*